United States Patent
Marsolek

(10) Patent No.: US 10,963,148 B2
(45) Date of Patent: Mar. 30, 2021

(54) CONTROL SYSTEM FOR COORDINATING PAVING OPERATIONS

(71) Applicant: Caterpillar Paving Products Inc., Brooklyn Park, MN (US)

(72) Inventor: John Lee Marsolek, Watertown, MN (US)

(73) Assignee: Caterpillar Inc., Brooklyn Park, MN (US)

(*) Notice: Subject to any disclaimer, the term of this patent is extended or adjusted under 35 U.S.C. 154(b) by 0 days.

(21) Appl. No.: 16/521,114

(22) Filed: Jul. 24, 2019

(65) Prior Publication Data
US 2019/0347000 A1 Nov. 14, 2019

Related U.S. Application Data

(63) Continuation of application No. 14/997,243, filed on Jan. 15, 2016, now Pat. No. 10,474,338.

(51) Int. Cl.
*G06F 3/048* (2013.01)
*G06F 3/0484* (2013.01)
(Continued)

(52) U.S. Cl.
CPC .......... *G06F 3/04847* (2013.01); *E01C 19/48* (2013.01); *G05B 19/409* (2013.01);
(Continued)

(58) Field of Classification Search
CPC ... G06F 3/04847; G06F 3/0482; G06Q 50/08; G06Q 10/06; E01C 19/48; G05B 19/409;
(Continued)

(56) References Cited

U.S. PATENT DOCUMENTS

| 5,646,844 A | 7/1997 | Gudat et al. |
| 6,460,005 B1 | 10/2002 | Chang |

(Continued)

FOREIGN PATENT DOCUMENTS

| CN | 201060408 | 5/2008 |
| CN | 102409592 | 4/2012 |

(Continued)

OTHER PUBLICATIONS

Weihan Zhang et al., The Control System Research of Paving Machine for the modified asphalt coiled material, Aug. 1, 2011, IEEE Xplore, pp. 2433-2437 (Year: 2011).*

(Continued)

*Primary Examiner* — Tam T Tran
(74) *Attorney, Agent, or Firm* — Schwegman, Lundberg & Woessner

(57) ABSTRACT

A control system for coordinating a plurality of machines for performing a paving operation is disclosed. The control system may include a communication device configured to exchange data messages with the plurality of machines and a material production plant and a controller. The controller may be configured to generate a first graphical user interface on a display device, the first graphical user interface having a plurality of first graphical objects, each being indicative of one of the plurality of machines or the material production plant, wherein each of the plurality of first graphical objects is selectable via an input device. The controller may also be configured to determine a status score of each of the plurality machines and the material production plant wherein each of the first graphical objects is further indicative of the status score of the indicated one of the machines or the material production plant.

20 Claims, 8 Drawing Sheets

(51) Int. Cl.
| | |
|---|---|
| *G06Q 50/08* | (2012.01) |
| *G06Q 10/06* | (2012.01) |
| *E01C 19/48* | (2006.01) |
| *G05B 19/409* | (2006.01) |
| *G06F 3/0482* | (2013.01) |
| *G07C 5/08* | (2006.01) |

(52) U.S. Cl.
CPC ........... *G06F 3/0482* (2013.01); *G06Q 10/06* (2013.01); *G06Q 50/08* (2013.01); *G07C 5/0808* (2013.01); *G07C 5/0816* (2013.01); *G07C 5/0841* (2013.01); *G05B 2219/32128* (2013.01)

(58) Field of Classification Search
CPC ........ G05B 2219/32128; G07C 5/0808; G07C 5/0816; G07C 5/0841
See application file for complete search history.

(56) References Cited

U.S. PATENT DOCUMENTS

| | | | |
|---|---|---|---|
| 6,460,006 | B1 | 10/2002 | Corcoran |
| 6,749,364 | B1 | 6/2004 | Baker et al. |
| 8,099,218 | B2 | 1/2012 | Glee et al. |
| 8,306,836 | B2 | 11/2012 | Nichols et al. |
| 8,356,957 | B2 | 1/2013 | Weiser |
| 8,924,152 | B2 | 12/2014 | Hunt et al. |
| 8,930,092 | B2 | 1/2015 | Minich |
| 9,011,036 | B2 | 4/2015 | Achterkirch et al. |
| 2002/0059320 | A1 | 5/2002 | Tamaru |
| 2002/0196151 | A1 | 12/2002 | Troxler |
| 2005/0171692 | A1 | 8/2005 | Hamblen et al. |
| 2007/0142059 | A1 | 6/2007 | Wang |
| 2007/0239338 | A1 | 10/2007 | Potts et al. |
| 2008/0084332 | A1 | 4/2008 | Ritter et al. |
| 2012/0066019 | A1 | 3/2012 | Hinshaw et al. |
| 2012/0185168 | A1 | 7/2012 | Patel et al. |
| 2012/0221379 | A1 | 8/2012 | Martinez et al. |
| 2012/0263530 | A1* | 10/2012 | Buschmann ............ E01C 19/00 404/72 |
| 2012/0288328 | A1* | 11/2012 | Minich ................... E01C 19/23 404/72 |
| 2013/0198088 | A1 | 8/2013 | Mewes et al. |
| 2013/0268890 | A1 | 10/2013 | Jensen et al. |
| 2013/0290062 | A1* | 10/2013 | Patel ................ G06Q 10/06313 705/7.23 |
| 2015/0275482 | A1 | 10/2015 | Hill et al. |
| 2016/0061755 | A1* | 3/2016 | Delius .................... E01C 19/48 374/43 |
| 2016/0117372 | A1 | 4/2016 | Krafft |
| 2017/0205814 | A1 | 7/2017 | Marsolek |
| 2017/0205999 | A1 | 7/2017 | Marsolek |
| 2017/0228108 | A1 | 8/2017 | Marsolek |

FOREIGN PATENT DOCUMENTS

| | | |
|---|---|---|
| CN | 202595600 | 12/2012 |
| CN | 103290760 | 9/2013 |
| CN | 103321129 | 9/2013 |
| CN | 103866673 | 6/2014 |
| CN | 105019339 | 11/2015 |
| KR | 101035091 | 5/2011 |
| WO | 2013040769 | 3/2013 |
| WO | 2017123984 | 7/2017 |

OTHER PUBLICATIONS

Chengjun et al., Study of Intelligent Cooperation System of Road Construction Machinery Groups Based on Multi-Agent, Jun. 1, 2008, IEEE Xplore, pp. 4853-4858 (Year: 2008).*
"U.S. Appl. No. 15/381,094, Non Final Office Action dated Oct. 12, 2018", 10 pgs.
"U.S. Appl. No. 15/381,094, Response filed Feb. 5, 2019 to Non Final Office Action dated Oct. 12, 2018", 14 pgs.
"U.S. Appl. No. 15/381,094, Final Office Action dated Feb. 28, 2019", 11 pgs.
"U.S. Appl. No. 14/997,243, Notice of Allowance dated Mar. 18, 2019", 11 pgs.
"U.S. Appl. No. 15/381,094, Response filed Apr. 24, 2019 to Final Office Action dated Feb. 28, 2019", 15 pgs.
"U.S. Appl. No. 14/997,243, Non Final Office Action dated Sep. 20, 2018", 15 pgs.
"U.S. Appl. No. 14/997,243, Response filed Dec. 10, 2018 Non Final Office Action dated Sep. 20, 2018", 20 pgs.
"U.S. Appl. No. 14/997,243, Corrected Notice of Allowability dated May 1, 2019", 2 pgs.
"U.S. Appl. No. 15/381,094, Advisory Action dated May 21, 2019", 3 pgs.
"U.S. Appl. No. 15/381,072, Non-Final Office Action dated Mar. 8, 2019", 16 pgs.
"International Application Serial No. PCT/US2017/013489, International Search Report dated Mar. 31, 2017", 3 pgs.
"International Application Serial No. PCT/US2017/013489, Written Opinion dated Mar. 31, 2017", 9 pgs.
"U.S. Appl. No. 14/997,243, Notice of Allowance dated Jul. 8, 2019", 10 pgs.
"U.S. Appl. No. 15/381,072, Response filed Jun. 21, 2019 to Non Final Office Action dated Mar. 8, 2019", 11 pgs.
Bajwa, Ravneet, et al., "In-Pavement Wireless Sensor Network for Vehicle Classification", Conference Paper, IEEE, (Apr. 2011), 13 pgs.
Claussen, Heiko, et al., "iPass: Intelligent Pavement Signaling System", Conference Paper in Conference Record—IEEE Conference on Intelligent Transportation Systems, (Sep. 2012), 7 pgs.
Hasslbauer, Mike, "Trimble CCSFlex and GCS900 AccuGrade Compaction Control System for Soil and Asphalt compactors", (2012), 13 pgs.
Qin, Yin, et al., "Research on automatic control of paver leveling system based on DSP host controller", 2010 2nd conference on Environmental Science and Information Application Technology, (2010), 321-324.
Zhang, Weihan, et al., "The Control System Research of Paving Machine for the modified asphalt coiled material", Proceedings of the 2011 IEEE International Conference on Mechatronics and Automation, (Aug. 2011), 2433-2437.

* cited by examiner

CONTROL SYSTEM FOR COORDINATING PAVING OPERATIONS

CLAIM OF PRIORITY

This application is a continuation of U.S. patent application Ser. No. 14/997,243, filed on Jan. 15, 2016, which is incorporated herein by reference in its entirety.

TECHNICAL FIELD

The present disclosure relates generally to a control system and, more particularly, to a control system for coordinating paving operations.

BACKGROUND

Paved roadways that are built to facilitate vehicular travel are typically resurfaced from time to time as wear and tear caused by several factors, such as fatigue and freeze-thaw cycles, degrades the surface of the roadway. Many paved roadways consist of an asphalt surface course that is supported by a base course comprising one or more layers of aggregate material deposited on a subgrade of native earth material. After the base course is prepared during a road building operation or after the old surface course is removed during a resurfacing operation, fresh asphalt for the new surface course is laid down using a paving machine and compacted to form a strong, smooth road surface. The fresh asphalt is produced at a plant and delivered to the worksite in haul trucks while the asphalt is still at a high enough temperature to be effectively laid down and compacted. If too much time passes before the asphalt is laid down and compacted, the asphalt can cool to temperatures at which it becomes unworkable by the paving and compacting machines and must be discarded or replaced, which can reduce productivity and be costly.

In many cases, paving operations that move at a steady, consistent pace can be successfully managed to achieve productivity goals while minimizing waste in terms of time, manpower, and material. However, situations often arise that can result in the delay of certain aspects of the paving operation and require operators and supervisors to respond quickly and effectively in order to prevent a chain of delays that can lead to significant waste. To avoid delays, supervisors may wish to coordinate asphalt production rates, paving rates, compacting rates, and material delivery logistics with each other and with respect to asphalt temperature. But coordinating these aspects can be challenging where such coordination relies on the abilities of and communication among multiple personnel and/or control systems responsible for each process.

A system for controlling asphalt production and a paving process is disclosed in U.S. Pat. No. 9,011,038 that issued to Buschmann et al. on Apr. 21, 2015 ("the '038 patent"). In particular, the '038 patent discloses a system for controlling the quantity and temperature of asphalt produced at a plant and regulating a rate of using the asphalt in a paving process at a jobsite. The system includes a mixing plant where asphalt is produced at a certain temperature and a number of trucks for delivering the asphalt to a paving machine. The system also includes a controller that determines a demand forecast for paving material at the pacing machine based on a laying speed, the asphalt temperature at the paving machine, and a stored work schedule containing pavement plans, including geometry, thickness, and degree of compaction. Based on the demand forecast, the controller sends request signals to the plant, and the plant adjusts the temperature of the asphalt it produces so the asphalt arrives at the jobsite at a set temperature. The production temperature of the asphalt may be adjusted at the plant based on a deviation of the asphalt temperature at the paving machine from the set temperature. The temperature and amount of prepared material is communicated to the paving machine, and the paving rate of the paving machine is adjusted based on this information.

While the system of the '038 patent may allow for the delivery temperature of the asphalt and the paving rate to be controlled, it may not be optimum. In particular, the information provided to the operator of the paving machine by the system of the '038 patent may not be easily used by operators of all skill levels to determine how to particularly adjust operating parameters of the paving machine to achieve targeted performance levels. Further, the system of the '038 patent may not consider other important processes of the resurfacing operation or provide operators associated with those processes with information for performing their tasks based on asphalt temperature and in coordination with other machines or operations.

The control system of the present disclosure solves one or more of the problems set forth above and/or other problems in the art.

SUMMARY

In one aspect, the present disclosure is related to a control system for coordinating a plurality of machines for performing a paving operation on a worksite. The control system may include a communication device configured to exchange data messages with the plurality of machines and a material production plant, a display device, an input device configured to receive user inputs, and a controller in communication with the communication device, the display device, and the input device. The controller may be configured to generate a first graphical user interface on the display device, the first graphical user interface having a plurality of first graphical objects, each being indicative of one of the plurality of machines or the material production plant, wherein each of the plurality of first graphical objects is selectable via the input device. The controller may also be configured to determine a status score of each of the plurality of machines and the material production plant based on the data messages, wherein each of the plurality of first graphical objects is further indicative of the status score of the indicated one of the plurality of machines or the material production plant.

In another aspect, the present disclosure is related to a control system for coordinating a paving operation on a worksite. The control system may include a speed sensor associated with a paving machine and configured to generate a first signal indicative of a groundspeed of the paving machine, a production monitoring system associated with the paving machine and configured to generate a second signal indicative of an amount of material deposited by the paving machine, a communication device configured to send and receive data communications, a display device, and a controller in electronic communication with the speed sensor, the production monitoring system, the communication device, and the display device. The controller may be configured to receive a third signal indicative of a production rate of a material production plant via the communication device, determine a target groundspeed of the paving machine based on the second and third signals, and generate a graphical user interface on the display device, wherein the graphical user interface includes a first graphical object indicative of a difference between the groundspeed and the target groundspeed of the paving machine.

In yet another aspect, the present disclosure is directed to a control system for coordinating a paving operation on a worksite. The control system may include a first speed sensor associated with a compacting machine and configured to generate a first signal indicative of a groundspeed of the compacting machine, a second speed sensor associated with a paving machine and configured to generate a second signal indicative of a groundspeed of the paving machine, a communication device configured to send and receive data communications, a display device, and a controller in electronic communication with the first and second speed sensors, the communication device, and the display device. The controller may be configured to determine a target groundspeed of the compacting machine based at least in part on the second signal, determine a difference between the groundspeed of the compacting machine and the target groundspeed, and generate a graphical user interface on the display device, wherein the graphical user interface includes a first graphical object indicative of the difference between the groundspeed of the compacting machine and the target groundspeed.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling.

Figure 1:
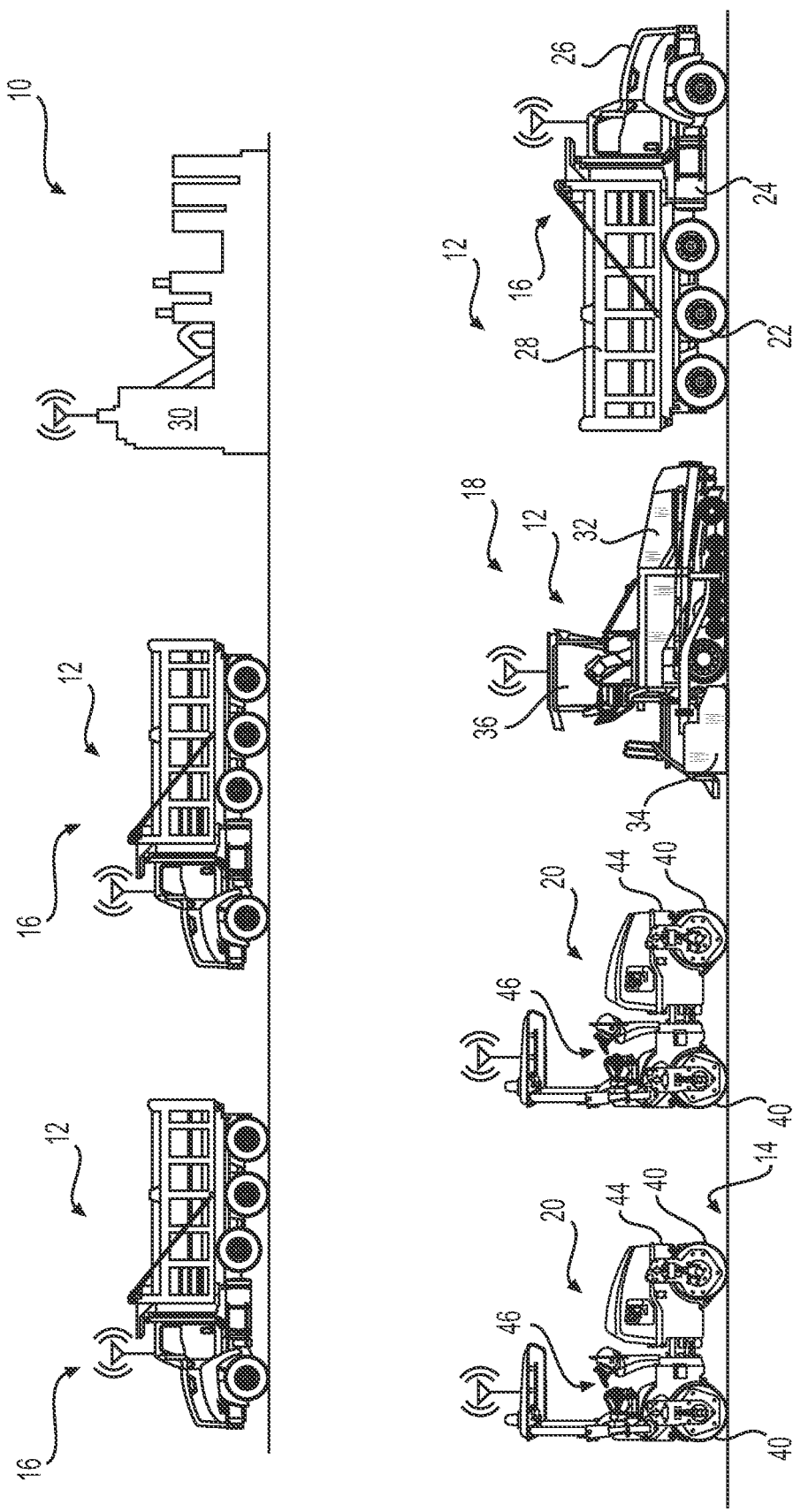
FIG. 1 is a pictorial illustration of an exemplary worksite of a road surfacing operation having a plurality of machines.

FIG. 1 shows an exemplary worksite 10 where a plurality of machines 12 are employed to perform a road surfacing operation, such as laying down an asphalt layer onto a work surface 14. The surfacing operation may involve completing a plurality of different tasks according to a planned design model of the finished road. Each machine 12 may be used to perform one or more of the plurality of tasks based on the types of operations that each respective machine 12 is configured to perform. That is, each machine 12 may be particularly configured to perform certain tasks that other machines may not be configured to perform. In this way, each machine 12 may be associated with one of the plurality of tasks.

For example, machines 12 may include one or more (i.e., at least one) haul trucks 16, paving machines ("paver") 18 (only one shown), and compacting machines ("compactors") 20. It is understood that other types of machines may be used. Each haul truck 16 may be a mobile machine supported on a plurality of wheels 22 connected to a frame 24. Wheels 22 may be operably connected to and driven by an engine 26 via a plurality of drivetrain components (e.g., a flywheel or a torque converter, a transmission, a driveshaft, a differential, an axle, etc.). Each haul truck 16 may also include a bed 28 attached to frame 24 for carrying an amount of material, such as paving material (e.g., asphalt), from a first location, such as an asphalt production plant ("plant") 30, to a second location, such as worksite 10. Bed 28 may have an open top side for receiving material and an enclosed rear side having a hinged tailgate for dumping material. The rear side of bed 28 may also be connected to frame 24 via a hinging mechanism, and a lifting actuator (e.g., a hydraulic cylinder) may be attached to a front side of bed 28, thereby allowing the front side of bed 28 to be tipped upward for dumping material.

Paver 18 may be a wheeled or tracked machine equipped with a hopper 32 at a front side of paver 18 for storing paving material to be deposited onto work surface 14. Material from hopper 32 may be moved via a conveyor system to a rear side of paver 18 where the material may be deposited onto work surface 14. Hopper 32 may have an open top side configured to receive additional material from haul truck 16 to replace deposited material. The material may be distributed across at least a portion of a width of paver 18 by an auger or other distribution device.

A screed 34 may be connected to the rear end of paver 18, and paver 18 may pull screed 34 over the freshly deposited material to create a mat of paving material having a desired thickness on top of work surface 14. Screed 34 may include one or more screed plates that smooth out the fresh paving material. The screed plates may be adjustable via one or more associated actuators for changing the height, width, and/or slope of the screed plates. In some embodiments, one or more of the screed plates may be connectable to an end of another screed plate by fasteners or another type of connections. Operating parameters, such as a groundspeed of paver 18 and the height, width, and slope of screed 34 may be controlled from an operator station 36 using a plurality of control devices 38 (shown only in FIG. 2).

Compactors 20 may be equipped with compacting tools 40 configured to compact the material beneath them. As shown in FIG. 1, compactor 20 may be supported on the work surface 14 by compacting tools 40 and propelled via a hydraulic system operatively connected to and driven by a power source (e.g., an engine). Compacting tool 40 may be rotationally connected to a frame 44. In this way, compactor 20 may be driven forward on compacting tools 40. Operating parameters, such as a groundspeed, a travel direction, and/or other parameters, may be controlled from an operator station 46 using a plurality of control devices 48. In some embodiments, compacting tool 40 may be a drum having a smooth outer surface configured to engage and compact work surface 14. The drum may include an internal vibratory system comprising one or more eccentric weights driven by motors. The eccentric weights may vibrate compacting tool 40 at a certain frequency and amplitude to cause greater compaction of the material beneath compacting tool 40. The frequency and amplitude of the vibratory system, along with other operating parameters, such as a groundspeed and travel direction of compactor 20, may be controlled from operator station 46 using at least one of the plurality of control devices 48.

Plant 30 may be configured to produce asphalt for use at worksite 10. The asphalt produced at plant 30 may comply with certain specifications, such as aggregate size (e.g., fine grade, course grade, etc.), aggregate material type (e.g., granite, river gravel, sandstone, etc.), aggregate shape (e.g., round, angular, etc.), percent of asphalt cement, production temperature, etc. Plant 30 may produce asphalt at a certain production rate, such as an amount of asphalt (e.g., tons) per hour, and in accordance with a production plan, which may include goals and/or limitations on amounts of asphalt produced over a period of time (e.g., per day) or for use on a particular jobsite (e.g., worksite 10). Although only one plant 30 is shown in FIG. 1, plant 30 may be one of a plurality of plants that produce asphalt for use on worksite 10. As used herein, the phrase "production rate" may refer to an amount of material (e.g., a weight, a mass, a volume, a two-dimensional area, etc.) per unit time, such as a mass flow rate, a volume flow rate, an amount per unit area, amount per unit length, etc.

Asphalt produced at plant 30 may have an initial temperature immediately following production that is relatively high and decreases over time. Generally, haul trucks 16 transport hot asphalt from plant 30 to worksite 10 so that when the asphalt is loaded into paver 18, the temperature of the asphalt is still high enough to be properly deposited and compacted. When the paving operation on worksite 10 is delayed for any reason, haul trucks 16 can be delayed from unloading their fresh asphalt, which can lead to the fresh asphalt being significantly reduced in temperature.

This can reduce the amount of time available for paver 18 to deposit the asphalt and for compactors 20 to compact the deposited asphalt before it becomes too cool and unworkable. Further, delays in the paving process can create situations in which haul trucks 16, paver 18, and/or compactors 20 sit idly until the paving process resumes, which can reduce the overall efficiency of the surfacing operation.

Figure 2:
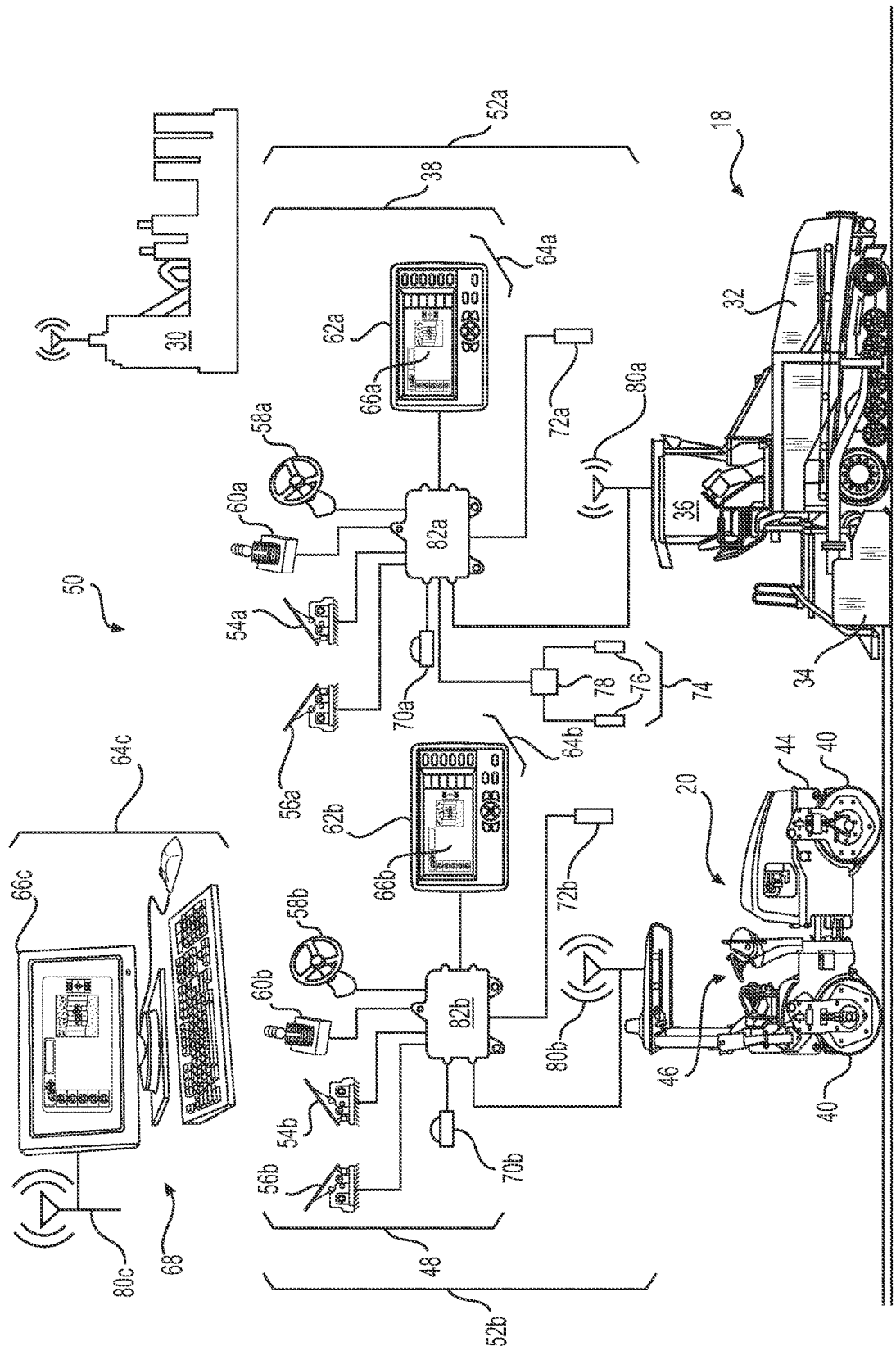
FIG. 2 is a diagrammatic illustration of an exemplary disclosed control system that may be used to coordinate the operations of the machines of FIG. 1.

To provide operators and supervisors with the ability to observe and/or control aspects of the surfacing operation from asphalt production to the final compacting operation, a control system 50, as shown in FIG. 2, may be provided. Control system 50 may be configured to collect data from each machine 12 and plant 30 and present the data to operators and supervisors in a format that allows them to quickly understand the state of the surfacing operation and coordinate tasks to avoid delays. Control system 50 may include a plurality of machine control systems, each being configured to gather and process machine data, such as current and historical operating parameters, and allow operators and supervisors to view the data and respond by manipulating current operating parameters.

For example, FIG. 2. shows a first machine control system 52a associated with paver 18 and a second machine control system 52b associated with compactor 20. It is noted that although FIG. 2 only shows machine control systems 52a, 52b, other machines, such as haul trucks 16, and plant 30 may each include a similar associated control system. Each machine control system 52a, 52b may include a plurality of devices configured to allow for manual or automatic control of certain machine operations and adjustments of certain operating parameters particular to paver 18 or compactor 20, respectively. For instance, machine control system 52a associated with paver 18 may include control devices 38 and control system 52b associated with compactor 20 may include control devices 48.

Control devices 38 may include devices that may be located onboard (e.g., in operator station 36) or off-board paver 18 that are configured to be used by personnel to control the operations and operating parameters of paver 18. For example, control devices 38 may include machine controls, such as an accelerator 54a for controlling the groundspeed of paver 18, a brake 56a for controlling the deceleration of paver 18, a steering device 58a for controlling the travel direction of paver 18, and a tool control 60a for controlling one or more tool positions and/or orientations. For instance, tool control 60a of paver 18 may be configured to control one or more of the height, width, and slope of screed 34. Tool control 60a may embody one or more levers, push buttons, switches, joysticks, etc. Although each of control devices 38 is shown in FIG. 2 as a separate device, it is understood that the functions of multiple control devices may be incorporated into a single device, such as a single joystick or electronic control device.

Control devices 38 may also include a multi-functional control device 62a configured to receive information from and provide information to personnel for controlling paver 18. For example, control device 62a may include one or more input devices 64a, such as buttons, soft keys, a keyboard, a mouse, a touch screen, etc., for receiving inputs from personnel indicative of information or requests for information relating to paver 18. Control device 62a may also include a display device 66a, such as an LED, LCD, CRT, or other type of display device configured to receive signals and show information associated with the signals. In some embodiments, control device 62a may be an off-board entity, such as an off-board computer 68 that includes input device 64c and display device 66c and is configured to include or communicate with machines 12 and plant 30.

Off-board computer 68 may be a desktop computer, a laptop computer, or a mobile device, such as a cellular phone, a tablet, a specialized computing device, or another type of electronic device. Off-board computer 68 may include a processor configured to carry out operations consistent with the present disclosure, associated memory containing instructions for carrying out operations consistent with the present disclosure, and communications equipment (e.g., hardware and software) configured to allow off-board computer 68 to communicate data with other electronic devices via wired or wireless platforms (e.g., cellular, Bluetooth, Wi-Fi, infrared, etc.).

Control system 52a may also include a locating device 70a configured to determine a two- or three-dimensional location of paver 18 with respect to a global or local coordinate system. For example, locating device 70a may be configured to receive location signals from a plurality of satellites associated with a global navigation satellite system (GNSS), such as Naystar Global Positioning System (GPS), GLONASS, Galileo, Beidou, etc. Locating device 70a may use the positioning signals to determine its own position (e.g., by trilateration) with respect to the coordinate system, which may be used to determine the location of the paver 18.

Control system 52a may also include one or more sensors 72a (only one shown), each being associated with an operating parameter or an actuator for carrying out commands from operators and supervisors received via control devices 38. Sensors 72a may generate signals indicative an operating parameter (e.g., a temperature, a pressure, a fluid level, etc.) or an actuator position that may be used to determine other information about paver 18, such as one or more other operating parameters. For example, sensors 72a may include a speed sensor configured to generate a signal indicative of the groundspeed of paver 18. Sensors 72a may also include a temperature sensor configured to generate a signal indicative of a temperature of asphalt in hopper 32. It is understood that sensors 72a may include other types of sensors configured to generate signals indicative of other operating parameters associated with paver 18 for determine current operating parameters and/or tracking operating parameters over a period of operating time.

For instance, control system 52a may also include a production monitoring system 74 configured to generate a signal indicative of an amount of material (e.g., asphalt) deposited by paver 18. Production monitoring system 74 may include one or more position sensors 76 configured to generate signals indicative of the width, height (e.g., height above work surface 14), or slope of screed 34 or its individual screed plates. Each position sensor 76 may be associated with an actuator, such as a hydraulic or electronic actuator, configured to change the length, height, or slope of at least a portion of screed 34.

A control module 78 may be associated with production monitoring system 74 and configured to determine the amount of material deposited by paver 18 based on the signals generated by position sensors 76. For instance, control module 78 may be configured to determine an amount of material per unit distance traveled by paver 18 (e.g., based on the determined height and width of screed 34). Control module 78 may also be in electronic communication with other electronic devices included with or external to production monitoring system 74, such as sensors 72a, memory devices, and/or other computational devices, etc. Such devices may provide additional information used by control module 78 in determining the amount of material deposited by paver 18. For instance, when sensors 72a include a speed sensor configured to generate a signal indicative of the groundspeed of paver 18, control module 78 may receive this signal as an input for determining a total amount (e.g., a total volume) of asphalt deposited on work surface 14 over a period of paving time. Additional information, such as the density of the paving material deposited may be stored in memory associated with control module 78 or received as an input by control module 78 from another source. Using this additional information, control module 78 may be configured to determine the total weight (e.g., tons) or mass flow rate (e.g., tons per hour) of material deposited by paver 18.

In some embodiments, production monitoring system may also or alternatively include a material sensor and conveyor speed sensor associated with a conveying system (not shown) for moving material from hopper 32 to work surface 14 year screed 34. For example, the material sensor may include a mechanical sensor configured to detect a height of paving material being transferred on the conveyor system. Using the material height in conjunction with the speed of the conveyor and known dimensions of the conveying system, such as dimensions of tunnels connecting hopper 32 to the rear side of paver 18, control module 78 may be configured to determine the volume flow rate of material being deposited by paver 18. In some embodiments, the material sensors may alternatively embody an ultrasonic sensor, laser scanner, optical sensor, or another type of non-contact sensor configured to generate a signal indicative of a height or an area profile of the material on the conveyor system. Using the material height and known dimensions of the conveying system in conjunction with the conveyor speed, or using the area profile in conjunction with the conveyor speed, control module 78 may be configured to determine the volume flow rate of material deposited by paver 18. Using the known density of the paving material in conjunction with the volume flow rate, control module 78 may be configured to determine the mass flow rate and/or total amount (e.g., weight) of material deposited by paver 18 over a period of conveying time.

Control system 52a may also include a communication device 80a. Communication device 80a may include hardware and/or software that enables sending and receiving of data messages between paver 18 and off-board entities (e.g., others of machines 12, off-board computer 68, other devices, etc.). The data messages may be sent and received via a direct data link and/or a wireless communication link, as desired. The direct data link may include an Ethernet connection, a connected area network (CAN) or another data link known in the art. The wireless communications may include one or more of satellite, cellular, Bluetooth, WiFi, infrared, and any other type of wireless communications that enables communication device 80a to exchange information. Data messages transmitted via communication device 80a may include any data generated or information determined by any of the other components of control system 52a, including operating parameters of paver 18 (e.g., groundspeed, asphalt temperature, amount of material deposited, mass flow rate, etc.)

Control system 52a may also include a controller 82a in electronic communication with the other components of control system 52a. As used herein, the phrase "electronic communication" may refer to a configuration wherein data may be transferred via a wired connection, a wireless connection, or combinations thereof. Controller 82a may embody a computing device having a single microprocessor or multiple microprocessors and a means for monitoring inputs from other components of control system 50 and generating output signals based on the inputs. For example, controller 82a may include a memory, a secondary storage device, a clock, and a processing hardware for accomplishing a task consistent with the present disclosure. Numerous commercially available microprocessors can be configured to perform the functions of controller 82a. It should be appreciated that controller 82a could readily embody a general machine controller capable of controlling numerous other machine functions. Various other known circuits may be associated with controller 82a, including signal-conditioning circuitry, communication circuitry, and other appropriate circuitry. Controller 82a may be further communicatively coupled with an external computer system, instead of or in addition to including a computer system, as desired.

Controller 82a may be configured to receive data inputs from each component of control system 52a, process the data, and generate output signals based on the inputs and/or processed data. For example, controller 82a may be configured to receive inputs from control system 52a and automatically generate machine commands, such as commands to adjust (e.g., increase or decrease) the groundspeed of paver 18, adjust the width, height, or slope of screed 34, adjust the travel direction of paver 18, and/or adjust a feed rate of paving material from hopper 32 to screed 34 (e.g., via the speed of the conveyor system). Controller 82a may also be configured to generate output signals to other components of control system 52a. For example, controller 82a may be configured to generate graphical images indicative of operational information based on received inputs and display the graphical images on display device 66a for viewing by the operator of paver 18. The operational information indicated by the graphical images may include data generated by control system 52a, information generated by control system 52b received via communication device 80a, or a combination thereof (e.g., data generated by each control system 52a, 52b or information based on data generated by each control system 52a, 52b). That is, controller 82a may be configured to generate one or more output signals based on data generated by control system 52b of compactor 20.

Control system 52b may be a second machine control system included in control system 50, which may also be particularly associated with compactor 20. For instance, control system 52b may include a plurality of devices, such as control devices 48, configured to allow for manual or automatic control of certain operations and adjustments of certain operating parameters particular to compactor 20.

Control devices 48 may include devices that may be located onboard (e.g., in operator station 46) or off-board compactor 20 that are configured to be used by personnel to control the operations and operating parameters of compactor 20. For example, control devices 48 may include machine controls, such as an accelerator 54b for controlling the groundspeed of compactor 20, a brake 56b for controlling the deceleration compactor 20, a steering device 58b for controlling the travel direction of compactor 20, and a tool control 60b for controlling one or more aspects of compacting tool 40.

For instance, tool control 60b may be configured to control one or more of the vibration frequency or vibration amplitude (i.e., the compacting force) of compacting tool 40. Tool control 60b may also be configured to provide control of other aspects of compactor 20, such as a watering system, lighting, canopy operations, a parking brake, etc. Tool control 60b may embody one or more levers, push buttons, switches, joysticks etc. Although each of control devices 48 is shown in FIG. 2 as a separate device, it is understood that the functions of multiple control devices may be incorporated into a single device, such as a single joystick or electronic control device.

Control devices 48 may also include a multi-functional control device 62b configured to receive information from and provide information to personnel for controlling compactor 20. Control device 62b may similar to control device 62a and include, for example, one or more input devices 64b and a display device 66b. In some embodiments, control device 62b may be an off-board entity and, in some instances, may be the same off-board entity as control device 62a.

Control system 52b may also include a locating device 70b configured to determine a two- or three-dimensional location of compactor 20 and a communication device 80b configured to communicate data with others of machines 12 and off-board computer 68. Locating device 70b may be similar to locating device 70a, and communication device 80b may be similar to communication device 80a.

Control system 52b may also include one or more sensors 72b (only one shown), each being associated with an operating parameter or an actuator for carrying out commands from operators and supervisors received via control devices 38. Sensors 72b may generate signals indicative of an operating parameter (e.g., a temperature, a pressure, a fluid level, etc.) or an actuator position that may be used to determine other information about paver 18, such as one or more other operating parameters. For example, sensors 72b may include a speed sensor configured to generate a signal indicative of the groundspeed of compactor 20. Sensors 72b may also include a temperature sensor configured to generate a signal indicative of a temperature of work surface 14 (e.g., an infrared temperature sensor). It is understood that sensors 72b may include other types of sensors configured to generate signals indicative of other operating parameters associated with compactor 20 for determine current operating parameters and/or tracking operating parameters over a period of operating time.

Control system 52b may also include a controller 82b in electronic communication with the other components of control system 52b. Controller 82b may be structurally similar to controller 82a and be configured to receive data inputs from each component of control system 52b, process the data, and generate output signals based on the inputs and/or processed data. For example, controller 82b may be configured to receive inputs from control system 52b and automatically generate machine commands, such as commands to adjust (e.g., increase or decrease) the groundspeed of compactor 20, adjust the compacting energy (e.g., the vibration frequency or magnitude) of compacting tool 40, and/or adjust the travel direction of compactor 20.

Controller 82b may also be configured to generate output signals to other components of control system 52b. For example, controller 82b may be configured to generate graphical images indicative of operational information based on received inputs and display the graphical images on display device 66b for viewing by the operator of compactor 20. The operational information indicated by the graphical images may include data generated by control system 52b, information generated by control system 52a received via communication device 80b, or a combination thereof (e.g., data generated by each control system 52a, 52b or information determined based on data generated by each control system 52a, 52b). That is, controller 82b may also be configured to generate one or more output signals based on data generated by control system 52a of paver 18.

To provide supervisors with greater access to information about each machine 12 and plant 30 (referring to FIG. 1), control system 50 may be configured to gather data inputs from each machine control system 52a, 52b and plant 30 and present the information to supervisors in a visual format that can be quickly and easily understood. For example, control system 50 may include a portable or stationary computer configured to receive information from each machine control system 52a, 52b, such as off-board computer 68 equipped with a communication device 80c, and generate graphical images for conveying this information in a visual format at any location on or away from worksite 10. Although off-board computer 68 is particularly mentioned, it is understood that other computational devices (e.g., controller 82a, 82b) may be used to generate graphical images to convey this information.

Alternatively, machine control systems 52a, 52b and plant 30 may be in electronic communication with a central server configured to store programs and/or algorithms for processing information generated by machine control systems 52a, 52b and plant 30 and generating graphical images to convey the information. The server may be accessible via communication hardware, such as communication devices 80a, 80b, and/or in conjunction with other communication networks, such as the Internet. That is, control system 50 may include web-based features accessible to other electronic devices that are configured to convey information for monitoring and managing worksite 10.

INDUSTRIAL APPLICABILITY

The disclosed control system may be used with a plurality of machines where coordinating their respective operations on a worksite in an efficient and effective manner is important. The disclosed control system may be particularly useful for coordinating road surfacing operations where multiple machines are used to deliver paving material from a material production plant, deposit the paving material into a work surface, and compact the freshly deposited paving material. A controller within the system may receive location data and other operating parameters relating to each machine and the plant. The controller may also be configured to generate graphical images on a display device based on the received information. The graphical images may be configured to qualitatively and/or quantitatively convey the information from each machine and from the plant to allow operators and supervisors to quickly visualize and understand the state of operations on the worksite. The graphical images may also be used to receive input from the operators and supervisors for controlling particular aspects of each machine. An exemplary operation of control system 50 will now be explained.

It is noted that any computational function performed by off-board computer 68 in the examples discussed below may also or alternatively be performed by another computational device, such as controller 82a, 82b, an off-board server, or another computerized device.

Figure 3:
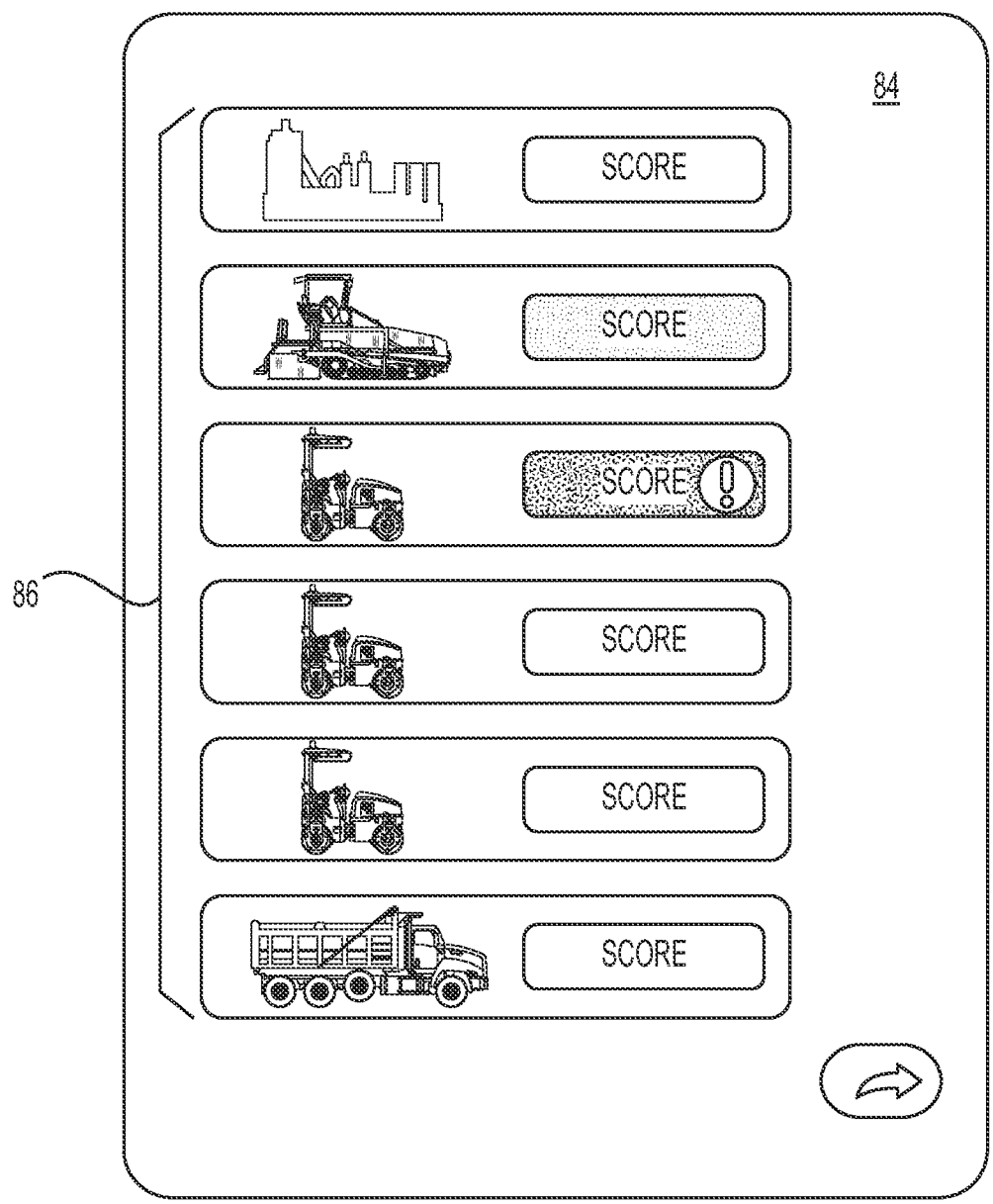
FIGS. 3-8 are pictorial illustrations of exemplary disclosed graphical user interfaces that may be generated by the control system of FIG. 2.

During a road surfacing operation, it may be a supervisor's responsibility to coordinate a plurality of machines (e.g., machines 12) for performing a paving operation on a worksite (e.g., worksite 10). To help coordinate machines 12, the supervisor may have access to a computer, such as off-board computer 68, from anywhere on or away from worksite 10 that is configured to provide operational information about each machine 12. Off-board computer 68 may receive data messages from each machine 12 on worksite 10 via communication device 80c and use the data messages to locate and identify each machine 12. For instance, each data message may contain GPS coordinates (e.g., generated by locating device 70a, 70b) and an associated machine ID. After determining which of machines 12 are present, off-board computer 68 may generate on its display device 66c a first graphical user interface (GUI) 84, as shown in FIG. 3.

GUI 84 may have a plurality of first graphical objects 86, each being indicative of one of the plurality of machines 12 (e.g., paver 18, compactors 20, etc.) or material production plant 30. Each of the plurality of graphical objects 86 may be selectable via input device 64c associated with off-board computer 68 (referring to FIG. 2). Each of graphical objects 86 may also be indicative of a status score of the indicated machine 12 or material production plant 30. The status score of each machine 12 or plant 30 may be an indication of whether and/or to what extent one or more operating parameters of each machine 12 or plant 30 deviates from an expected or target value or threshold value. In this way, supervisors may be able to use GUI 84 to quickly determine which, if any, of machines 12 and plant 30 require attention and how to prioritize subsequent efforts to address any issues. Graphical objects 86 may indicate which of machines 12 and plant 30 require attention based on differentiating visual indicia, such as a color scheme (e.g., red, yellow, green), textures, hatching, symbols, numerals, etc. It is understood that other types of indicia may be used.

Figure 4:
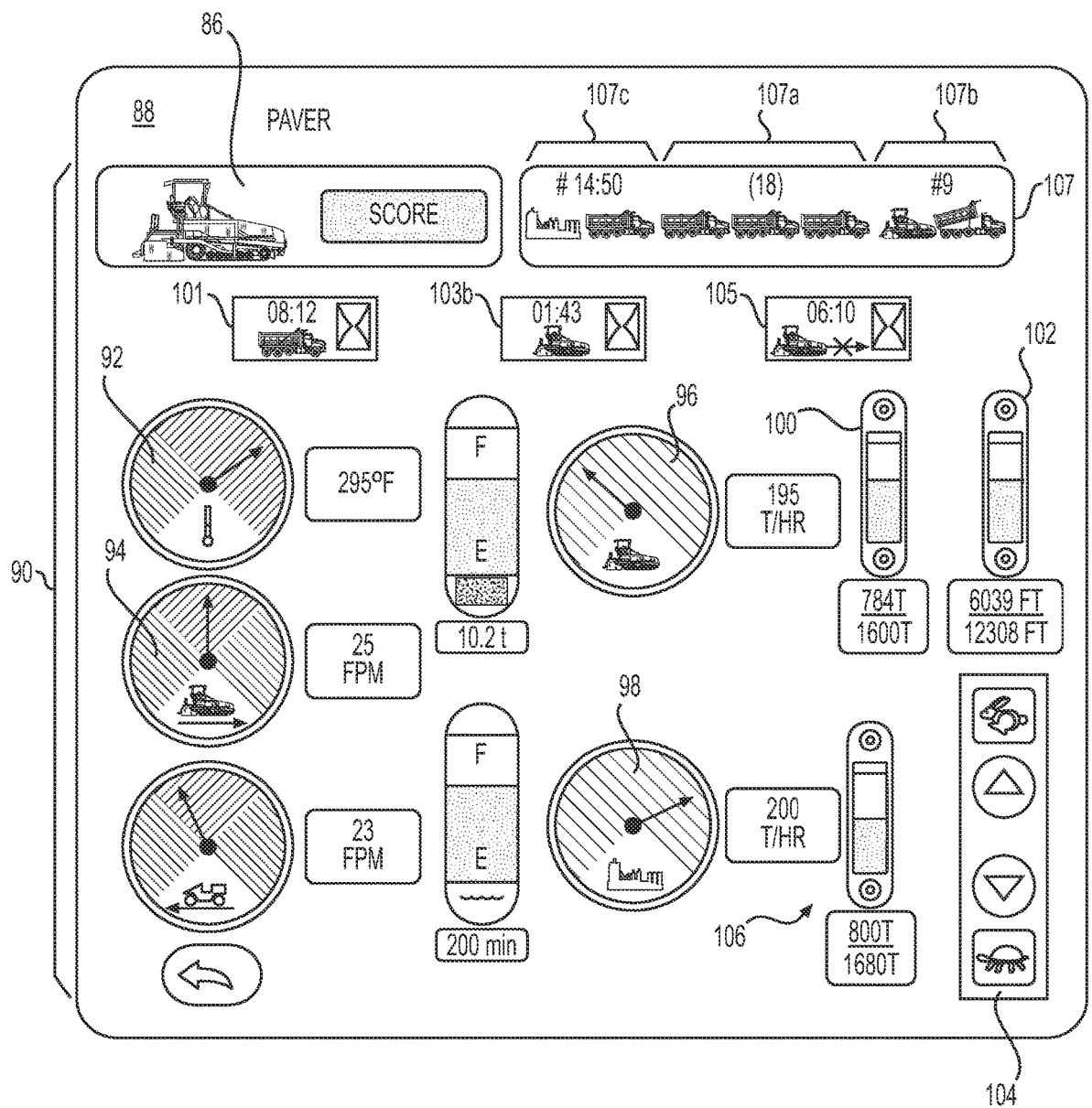

When a supervisor wishes to receive more detail about a particular machine 12 or plant 30, the supervisor may select one of graphical objects 86 via input device 64c. For example, the supervisor may select one of graphical objects 86 indicative of paver 18. Off-board computer 68 may receive the supervisor's selection as an input and generate a second graphical user interface (GUI) 88 on display device 66a, as shown in FIG. 4, based on the selection. GUI 88 may include a plurality of graphical objects 90, each being indicative of a difference between one of the plurality of operating parameters and the associated expected or target value. That is, graphical objects 90 may be indicative of the difference between each operating parameter and its associated target or expected value that was used to determine the status score of the selected machine 12 or plant 30.

As shown in the example of FIG. 4, graphical objects 90 of GUI 88 may be indicative of such differences for operating parameters of or relating to paver 18. For example, graphical objects 90 may include an asphalt temperature object 92, a paver groundspeed object 94, a paver production rate object 96, a plant production rate object 98, a total weight object 100 (i.e. of material deposited) and a total distance object 102 (i.e. distance paved). Such information may be used by a supervisor in determining how to coordinate operations of paver 18 and/or other machines 12 on worksite 10.

For instance, off-board computer 68 may receive data messages via communication device 80c indicative of the current asphalt temperature in hopper 32 (e.g., as determined by sensors 72a), groundspeed of paver 18 (e.g., as determined by sensors 72a), production rate of paver 18 (e.g., as determined by production monitoring system 74), production rate of plant 30, and amount of material deposited by paver 18 (e.g., as determined by production monitoring system 74). Off-board computer 68 may compare the temperature of asphalt in hopper 32 to a known target temperature or temperature range (e.g., 190° F.-320° F.) and determine whether the current asphalt temperature is within, above, or below the target range. Asphalt temperature object 92 may include qualitative indicia, such as a dial with colored areas, that may allow an operator to quickly understand whether and to what extent the asphalt in hopper 32 is at an adequate temperature for paving. Although asphalt temperature object 92 is shown as a dial, other types of indicia may be used, such as bars, flashing lights, color schemes, etc. In this way, supervisors may be able to quickly determine whether any issue exists with regard to the asphalt temperature.

Off-board computer 68 may also determine a target groundspeed for paver 18, compare the target groundspeed to the current groundspeed of paver 18, and generate paver groundspeed object 94 based on the difference. For example, off-board computer 68 may compare the plant production rate to the paver production rate and determine whether paver 18 is depositing material onto work surface 14 at a faster or slower rate than plant 30 is producing material. Off-board computer 68 may also concurrently generate paver production rate object 96 and plant production rate object 98 to allow the supervisor to visualize the difference between these production rates. As the production rate of plant 30 may dictate the maximum average production rate of paver 18, off-board computer 68 may determine the target groundspeed of paver 18 to be a suitable groundspeed at which the production rate of paver 18 is equal to or within an allowable difference of the plant production rate. For example, based on the width, height, and slope of screed 34 (referring to FIG. 2), as determined by sensors associated with production monitoring system 74 or known parameters, off-board computer 68 may determine the groundspeed of paver 18 that will cause the production rate of paver 18 to be equal to or within a tolerable difference of the production rate of plant 30.

Off-board computer 68 may then generate paver groundspeed object 94 to be indicative of the difference between the current groundspeed of paver 18 and the target groundspeed. Paver groundspeed object 94 may include features, such as a color scheme, hatching, blinking lights, etc., as an indication of the direction (e.g., higher or lower) and extent to which the current groundspeed is different from the target groundspeed. In this way, the supervisor may be able to quickly visualize and understand the relative production rates of plant 30 and paver 18. This information may allow the supervisor to determine whether and how the operations of paver 18 should be adjusted in order to bring the production rate of paver 18 to the target rate. For instance, the supervisor may be able to use this information to determine that the groundspeed of paver 18 should be adjusted. The supervisor can then communicate with the operator of paver 18 (e.g., via radio, cellular communications, onboard display, etc.) to effectively achieve the desired speed change or other operational adjustment.

In some embodiments, GUI 88 may also include a graphical object 104 configured to receive a user input indicative of a command to adjust (e.g., increase or decrease) the groundspeed of paver 18 to an adjusted groundspeed. For instance, the supervisor may determine based on the information in GUI 88 that paver 18 is depositing material at a slightly slower rate than plant 30 is producing it. The supervisor may then use graphical object 104 to override control of the groundspeed of paver 18 to be able to visualize whether and to what extent the production rate of paver 18 can become closer to the production rate of plant 30 when operated at the adjusted groundspeed. Adjustments to the groundspeed of paver 18 made via graphical object 104 may initiate a simulation mode, which may include the generation of an additional graphical user interface for displaying simulation parameters and results. The additional graphical user interface may be a duplication of GUI 88 that contains updated or regenerated graphical objects that show any changes to the operating parameters displayed in GUI 88 that may be affected by changing the groundspeed of paver 18.

The supervisor may be able to understand the effects of changing the groundspeed of paver 18 on the paving operation by the resulting changes in other operational parameters displayed via GUI 88 (or its duplicate). For example, if paver 18 is running too slowly, it may be using material more slowly than plant 30 is producing it. Depending on how long paver 18 was using less material than plant 30 was producing it, paver 18 may have fallen behind on the amount of material it is supposed to deposit for a given period of time, such as for the current day. The supervisor may then be able to compare the total amount of material deposited or the total distance traveled by paver 18 to a target amount or target distance for the current day, as provided by total weight object 100 and total distance object 102, to decide whether or not to increase the ground speed of paver 18 so the production rate of paver 18 is greater than the production rate of plant 30 in order to make up for lost time. GUI 88 may also include a graphical object 106 indicative of a total amount of material produced by and a total amount of material available from plant 30 for the current day, the current job, or other allotment criterial. The operator may then be able to see how these production parameters respond to a change in paver groundspeed by using graphical object 104. Based on this information, the supervisor may be able to determine whether or not a decision to increase the production rate of paver 18 above the production rate of plant 30 will starve paver 18 or whether it is necessary to contact another plant about receiving additional material to help meet production goals.

Although graphical object 104 has been described with reference to the groundspeed of paver 18, it is understood that other or additional adjustable parameters may instead be alterable by graphical object 104 or additional graphical objects, if desired. For example, screed settings (e.g., width, height, slope), conveyor feed rates, and or other parameters may be made adjustable via. GUI 88 for purposes of simulation or overriding machine control.

After the supervisor adjusts the groundspeed of paver 18 using graphical object 104, off-board computer 68 may update (i.e., regenerate) GUI 88 or certain ones of graphical objects 90 to reflect the difference on any operating parameter that the supervisor's actions may have. In some embodiments, inputs received by graphical object 104 may be used to cause off-board computer 68 to generate command signals communicable to paver 18 (i.e., machine control system 52a) for automatically adjusting the actual groundspeed of paver 18. In other embodiments, off-board computer 68 may enter a simulation mode or generate a simulation interface, as mentioned above, that is configured to reproduce GUI 88 using a simulation model or algorithm configured to predict and display how the change in groundspeed of paver 18 commanded by the supervisor will affect the paving operation. In other embodiments, GUI 88 may include other graphical objects to allow the supervisor to similarly adjust other aspects of paver 18, such as height, width, and slope of screed 34 and the feed rate of material from hopper 32 to screed 34.

As off-board computer 68 receives updated operating parameters from machines 12 and plant 30, as well as after any time the supervisor makes an adjustment to the groundspeed or other parameter of paver 18 during a simulation, off-board computer 68 may reevaluate the status score of paver 18. That is, off-board computer 68 may compare the current operating parameters (or simulated current operating parameters) of paver 18 to the target parameters and determine whether and to what extent they differ. Off-board computer 68 may then update first graphical objects 86 on GUI 84. As shown in FIG. 4, the first graphical object 86 associated with the selected machine 12 (e.g., paver 18) may be shown in GUI 88 (or a duplicate GUI generated during a simulation) to allow the supervisor to see the updated status score without having to return to GUI 84 (referring to FIG. 3), thereby allowing for a speedy adjustment process.

GUI 88 may also contain additional or other graphical objects configured to convey information about paver 18 and/or others of machines 12. For example, off-board computer 68 may receive signals indicative of the location and groundspeed of each other machine 12, including haul trucks 16 (referring to FIG. 1). Based on the location and groundspeed of each machine 12, off-board computer 68 may be configured to determine relevant statistical information and display the information via graphical objects. For instance, GUI 88 may include a graphical object 101 configured to display an amount of time until the next haul truck 16 arrives at paver 18 with fresh paving material. That is, location information associated with each haul truck 16 may be received via an associated location device, which can be used in conjunction with the known location of paver 18 to determine the amount of time until the next haul truck 16 arrives at paver 18. Based on the time until the next haul truck 16 arrives, the supervisor may be able to quickly understand whether adjustments to the production rate or groundspeed of any machine may be appropriate to avoid a delay in production or to avoid a delay in the use of fresh material (which can allow the fresh material to cool below a desired threshold temperature).

GUI 88 may also include a graphical object 103a indicative of a fill level of hopper 32 and a graphical object 103b indicative of an amount of time until hopper 32 will become empty. That is, an amount of material remaining in hopper 32 may be determined based on the signal generated by production monitoring system 74, which may be used in connection with the production rate of paver 18 to determine an amount of time remaining until hopper 32 becomes empty. Graphical objects 103a and 103b may be configured to convey the remaining amount of material and remaining time, respectively, so the supervisor may be able to quickly and easily understand how much material is in hopper 32 and for how long paver 18 can continue production without having to pause to refill hopper 32. Information provided by graphical objects 103a and 103b in conjunction with the information provided by graphical object 101 may allow a supervisor to quickly and easily decide whether and to what extent the groundspeed of paver 18 or of the next haul truck 16 should be adjusted (if possible) to minimize downtime and asphalt cooling time.

In the even that production is paused and paver 18 is stopped, GUI 88 may include a graphical object 105 that is indicative of an amount of time that paver 18 has been stopped and continues to sit idly. That is, the groundspeed of paver 18 may be determined based on a signal generated by a speed sensor or a positioning sensor, and the groundspeed may be tracked over a period of paving time to determine when the groundspeed of paver 18 is zero (i.e., when paver 18 is not moving or is idle). Graphical object 105 may be configured to convey the amount of time during which the groundspeed of paver 18 is zero (i.e., an idle time). As paver 18 sits idly, the paving material in hopper 32 may be allowed to cool, and may need to be discarded if the idle time exceeds a threshold amount of time. Thus, graphical object 105 may allow the supervisor to quickly and easily determine how long paver 18 has been idle and whether certain actions may need to be taken as a result of the elapsed time. Further, the weight of screed 34 can create grooves or other defects in the freshly laid asphalt if paver 18 sits idly for too long, which may require additional manpower, material, and time to repair. Thus graphical object 105 may help the supervisor to decide how to avoid or when to repair such defects Because plant 30 may be some distance (and time) away from worksite 10, supervisors may wish to be informed of certain details and parameters relating to the supply chain of haul trucks 16 bringing material from plant 30 to worksite 10. To help provide supervisors with information about the supply chain, GUI 88 may include a graphical object 107 configured to convey one or more supply chain parameters in a clear and simple way. For instance, GUI 88 may include a graphical object 107a indicative of a number of haul trucks 16 that are traveling between plant 30 and worksite 10 with fresh paving material. This information may allow supervisors to quickly understand, among other things, whether the supply chain is operating properly, whether pauses in production for lack of material are to be expected, or whether too much fresh material is in queue and is at risk of excessive cooling. A graphical object 107b may be configured to identify the truck 16 currently at paver 18 to allow the supervisor to understand which truck 16 in the scheduled queue of truck is currently filling hopper 32. A graphical object 107c may be configured to identify the truck currently being loaded with fresh material at plant 30 and its estimated arrival time at jobsite 10. This information may allow the supervisor to understand quickly how far along in the production process plant 30 is with respect to the scheduled production plan and how much time haul trucks 16 are currently taking to reach jobsite 10. Information conveyed by graphical objects 107a-c may be determined based on other supply chain parameters, such as the locations (e.g., as determined by a location device) and groundspeeds (e.g., as determined by a location device or speed sensor) of haul trucks 16.

Although certain graphical objects that may be indicative of certain parameters are shown in FIG. 4 (and other figures) and described herein, it is understood that other graphical objects indicative of other and/or additional parameters or information may be used to convey aspects relating to paving operations and support.

Parameters and other information indicated by the graphical objects contained in a graphical user interface (e.g., GUI 88) may each be associated with a respective threshold value or target value. The difference between the information displayed by a graphical object and its associated threshold or target value may be used to determine the status score of the machine 12 or plant 30 that is the subject of the graphical user interface. For instance, graphical object 86 in GUI 88 may be configured to indicate the status score of paver 18 based on a difference between the information displayed in any of the graphical objects in GUI 88 and its respective associated threshold or target value. For example, when the paver stop time as indicated by graphical object 105 exceeds an associated threshold, graphical object 86 may show a yellow or red status score, depending on the extent to which the stop time has exceeded the threshold. When paver 18 resumes operation (and if no other parameters are currently in excess of an associated threshold), the status score in graphical object 86 may be changed to green to indicate that the state of paving operations is acceptable. Graphical objects 86 as shown in FIG. 3 may also be configured to change color in coordination with graphical objects 86 of other graphical user interfaces. It is understood that although the status score has been explained above with respect to the stop time of paver 18 and GUI 88, status scores may be affected by other parameters (e.g., groundspeed, production rate, fuel level, water level, etc.) or differences between them. It is also understood that status scores for other machines (e.g., compactors 20, trucks 16, and plant 30) may be similarly determined. In this way, supervisors may be able to quickly and easily identify when issues arise that may need their attention.

Figure 5:
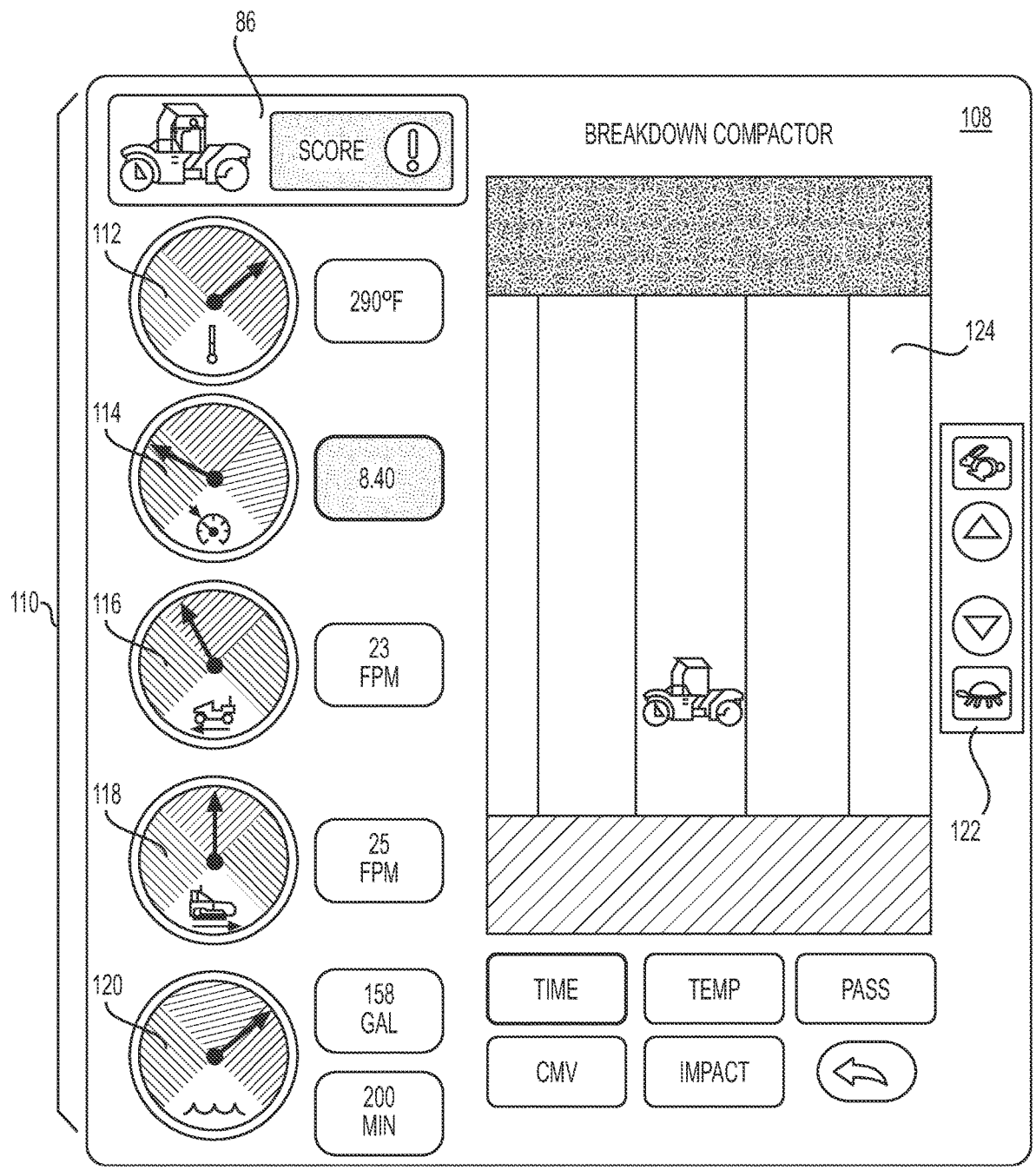

Referring again to FIG. 3, when the supervisor selects a first graphical objet 86 associated with another of machines 12, off-board computer 68 may generate another GUI corresponding to the selecting machine 12. For example when the supervisor selects a first graphical object 86 associated with one of compactors 20, off-board computer 68 may generate a corresponding GUI. For example, as shown in FIG. 5, off-board computer may generate a graphical user interface (GUI) 108 corresponding to a particular compactor 20 (e.g., a breakdown compactor). GUI 108 may contain graphical objects 110 indicative of a difference between an operating parameter associated with compactor 20 and an associated expected or target value. That is, graphical objects 110 may be indicative of the difference between an operating parameter and its associated target or expected value that was used to determine its status score displayed in GUI 84.

For example, graphical objects 110 may include a surface temperature object 112, an impacts object 114, a compactor groundspeed object 116, a paver groundspeed object 118, and a water object 120. Such information may be used by a supervisor in determining how to coordinate operations of compactor 20 in conjunction with the operations of paver 18 and/or other machines 12 on worksite 10.

For instance, off-board computer 68 may receive data messages via communication device 80c indicative of the current temperature of the freshly laid asphalt on top of work surface 14 (e.g., as determined by sensors 72b), the groundspeed of compactor 20 (e.g., as determined by sensors 72b), the groundspeed of paver 18 (e.g., as determined by sensors 72a), an amount of water for wetting compacting tool 40 (e.g., as determined by sensors 72b), and the location of compactor 20 (e.g., as determined by locating device 70b). Off-hoard computer 68 may compare the temperature of work surface 14 to a known target temperature or temperature range (e.g., 320° F.-190° F.) and determine whether the current temperature of work surface 14 is within, above, or below the target range. For instance, after paver 18 lays down a mat afresh material, compactor 20 (i.e., a breakdown compactor) may be instructed to compact the fresh mat while it is still at a particular temperature or within a particular temperature range. This may require compactor 20 to follow behind paver 18 at a certain distance that is dependent on the mat temperature. When the temperature of surface 14 is outside of the desired range, as indicated by surface temperature object 112, the supervisor may wish to adjust the distance between compactor 20 and paver 18 or pause the operation for further assessments.

At times, an operator of compactor 20 may intentionally or inadvertently put too much or too little distance between compactor and paver 18 during the compacting process and attempt to correct this distance. In doing so, a ratio of the vibration frequency associated with compacting tool 40 to the groundspeed of compactor may deviate from a desired ratio or range of ratios. That is, off-board computer 68 may receive via communication device 80c signals indicative of the vibration frequency of compacting tool 40 and the groundspeed of compactor 20 from machine control system 52b (referring to FIG. 2). The ratio of the vibration frequency to the groundspeed of compactor 20 may be indicative of the compacting energy (i.e., number of impacts per foot) applied to work surface 14 by compactor 20. When compactor slows down or speeds up, the number of impacts per foot increase or decreases, respectively. Depending on which compacting stage compactor 20 is performing (e.g., breakdown, intermediate, cleanup, etc.), compactor 20 may be assigned a certain target ratio target compacting energy) or target number of impacts per foot maintain during operation.

To help supervisors understand when the ultimate goal of imparting the target number of impacts per foot on work surface 14 is or is not being achieved, off-board computer may generate impacts object 114 to indicate the direction (e.g., higher or lower) and extent to which the current number of impacts per foot is different than the target number of impacts per foot. Impacts object 114 may include qualitative indicia, such as a dial with colored areas, bars, flashing lights, color schemes, etc. In this way, supervisors may be able to quickly determine whether any issue exists with regard to the number of impacts per foot being achieved by compactor 20.

Off-board computer 68 may also determine a target groundspeed for compactor 20, compare the target groundspeed to the current groundspeed of compactor 20, and generate compactor groundspeed object 116 based on the difference. For example, off-board computer 68 may receive and compare the paver groundspeed compactor groundspeed determined by sensors 72a and 72b, respectively. As the groundspeed of paver 18 may dictate the average groundspeed at which compactor 20 should travel to maintain a constant distance from paver 18, off-board computer 68 may determine the target groundspeed of compactor 20 to be a speed equal to or within an allowable difference of the groundspeed of paver 18.

Off-board computer 68 may then generate compactor groundspeed object 116 to be indicative of the difference between the current groundspeed of compactor 20 and the target groundspeed. Off-board computer 68 may also concurrently generate paver groundspeed object 118 to allow the supervisor to confirm whether any differences in impacts per foot or the detected temperature of work surface 14 may be attributable to a deviation of compactor 20 from its target groundspeed. Compactor groundspeed object 116 may include features, such as a color scheme, hatching, blinking lights, etc., as an indication of the direction (e.g., higher or lower) and extent to which the current groundspeed is different from the target groundspeed. In this way, the supervisor may be able to quickly visualize and understand the relative groundspeeds of compactor 20 and paver 18, as well as the implications this difference may have on other operating parameters. This information may allow the supervisor to determine whether and how to adjust the operations of compactor 20. Such an adjustment may include increasing or decreasing the groundspeed of compactor 20.

For example, GUI 108 may also include a graphical object 122 configured to receive a user input indicative of a command to adjust (e.g., increase or decrease) the groundspeed of compactor 20 to an adjusted groundspeed. For instance, the supervisor may determine based on the information in GUI 108 that compactor 20 is moving away from an area of paved surface 14 at the target temperature for compacting or that the number of impacts per foot being achieved is too low. The supervisor may then use graphical object 122 to increase or decrease the groundspeed of compactor 20 to cause the number of impacts per foot and/or the temperature of surface 14 in front of compactor 20 to reach the respective target value.

Depending on how long compactor 20 was moving farther or closer to paver 18, it can be difficult to achieve the proper distancing through groundspeed adjustments without falling below the target amount of impacts per foot. To help confirm that compactor 20 is meeting its target number of impacts per foot, GUI 108 may also include a map 124 of at least a portion of worksite 10 where compactor 20 is operating. Using the location of compactor 20 over time, as determined by locating device 70b (referring to FIG. 2), off-board computer 68 may be configured to generate map 124 to be indicative of where compactor 20 has traveled and number of impacts per foot achieved at each location (e.g., using a color scheme, hatching, patterns, etc.). Based on this information, the supervisor may be able to determine whether or not a decision to increase or decrease the groundspeed of compactor 20 is improving the compacting operation.

After the supervisor adjusts the groundspeed of compactor 20 using graphical object 122, off-board computer 68 may update (i.e., regenerate) GUI 108 or certain ones of graphical objects 110 to reflect the difference on any operating parameter that the supervisor's actions may have. In this way, the supervisor may be able to quickly identify an effective solution after performing one or more iterative adjustments. In some embodiments, inputs received by graphical object 110 may cause off-board computer 68 to generate command signals communicable compactor 20 (i.e., machine control system 52b) for automatically adjusting the actual groundspeed of compactor 20. In other embodiments, off-board computer 68 may enter a simulation mode or generate a simulation interface configured to reproduce GUI 108 using a simulation model or algorithm configured to predict and display how the change in groundspeed of compactor commanded by the supervisor will affect the compacting operation.

Although graphical object 122 has been described with reference to the groundspeed of compactor 20, it is understood that other or additional adjustable parameters may instead be alterable by graphical object 122 or additional graphical objects, if desired. For example, vibration settings, water feed rates, following distances, and or other parameters may be made adjustable via GUI 88 for purposes of simulation or overriding machine control.

In some embodiments, GUI 108 may include other graphical objects to allow the supervisor to similarly adjust other aspects of compactor 20. For example, water object 120 may be indicative of how much water remains in a storage tank onboard compactor 20. That is, compactor 20 may include a watering system for wetting compacting tool 40 to prevent fresh asphalt from sticking to it during compaction, and water object may be indicative of an amount of water remaining (e.g., as determined by sensors 72b). In this way, the supervisor may be able to determine when to refill the water tank based on the water level and/or other aspects of the operation that may provide an opportunity to refill without incurring delay or sacrificing compaction quality.

As off-board computer 68 receives updated operating parameters from machines 12 and plant 30, as well as after any time the supervisor makes an adjustment to the groundspeed or other parameter of compactor 20, off-board computer 68 may reevaluate the status score of compactor 20. That is, off-board computer 68 may compare the current operating parameters (or simulated current operating parameters) of compactor 20 to the target parameters and determine whether and to what extent they differ. Off-board computer 68 may then update first graphical objects 86 on GUI 84 to reflect any changes. As shown in FIG. 4, the first graphical object 86 associated with the selected machine 12 (e.g., compactor 20) may be shown in GUI 108 to allow the supervisor to see the updated status score without having to return to GUI 84 (referring to FIG. 3), thereby allowing for a speedy adjustment process.

Figure 6:
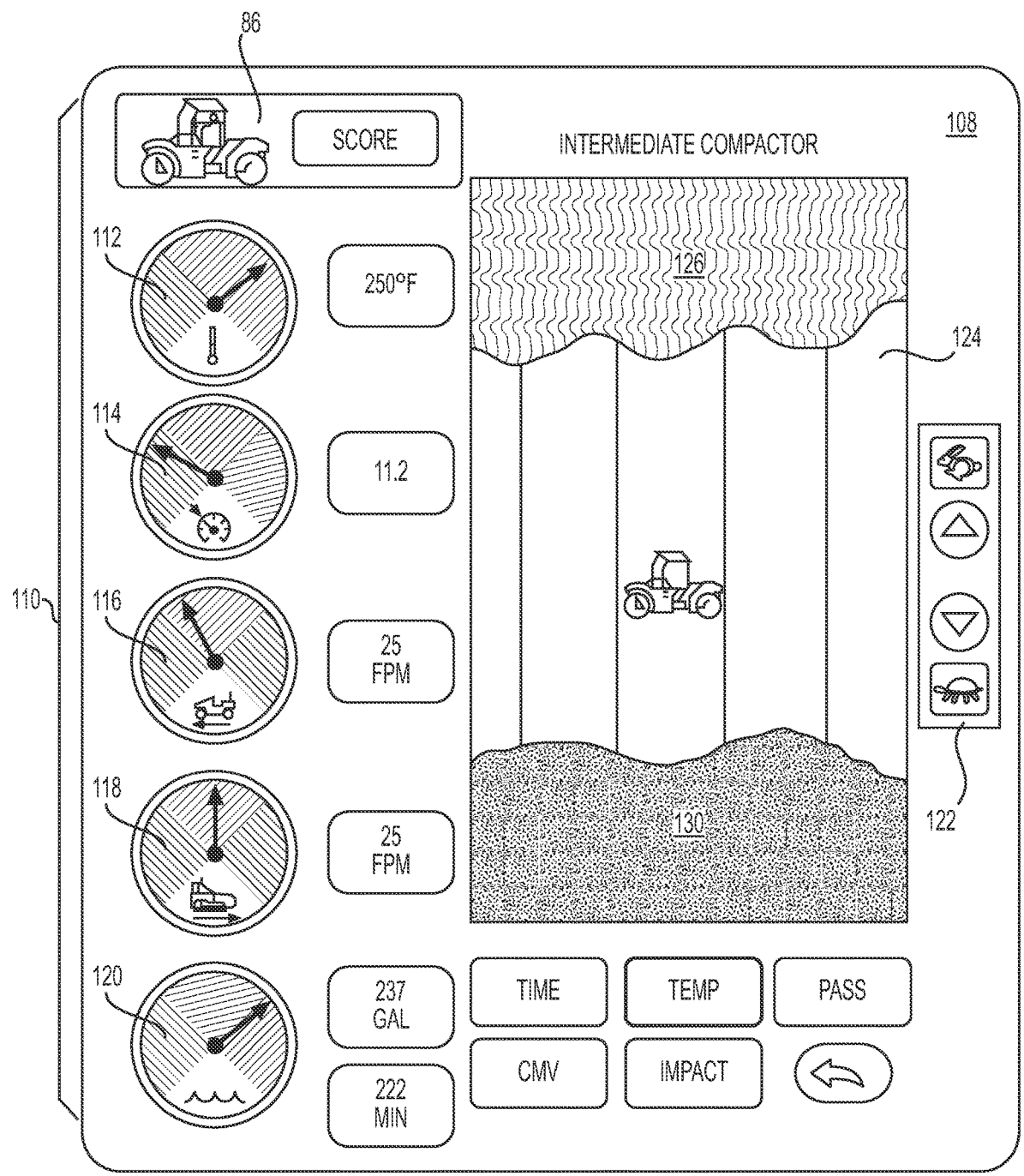

GUI 108 may also contain additional or other information configured allow the supervisor to visualize aspects of the compacting operation in great detail. For example, as shown in FIG. 6, map 124 may be configured to display additional information in coordination with the location of compactor 20 over a period of operating time. For instance, in addition to the number if impacts per foot achieved by compactor 20, off-board computer 68 may be configured to show the determined surface temperature of work surface 14, a pass count (i.e., number of times compactor traveled over a particular location), and/or compaction value (i.e., compaction quality factor) as a function of the location of compactor 20. That is, off-board computer 68 may associate one or more of the ratio of the vibration frequency to the groundspeed of compactor 20, the surface temperature of work surface 14, the pass count, and the compaction value with each recorded location of compactor 20 over a period of compacting time, and configure map 124 to indicate the associated value(s) in association with each recorded location. For example, when the supervisor selects an option to see the temperature of surface 14 when it was compacted by compactor 20, off-board computer 68 may generate map 124 to show the current location of compactor 20 in conjunction with the sensed temperature of work surface 14 when traversed by compactor 20. Map 124 may also or alternatively be configured to show the current temperature of surface 14 to allow the supervisor to see if compactor 20 is operating in areas that are above 126, at 128, or below 130 the target temperature for compaction. In this way, supervisors may be able to confirm whether areas of surface 14 have been or are being properly compacted, allowing for quick corrective measures to be taken when necessary.

Figure 7:
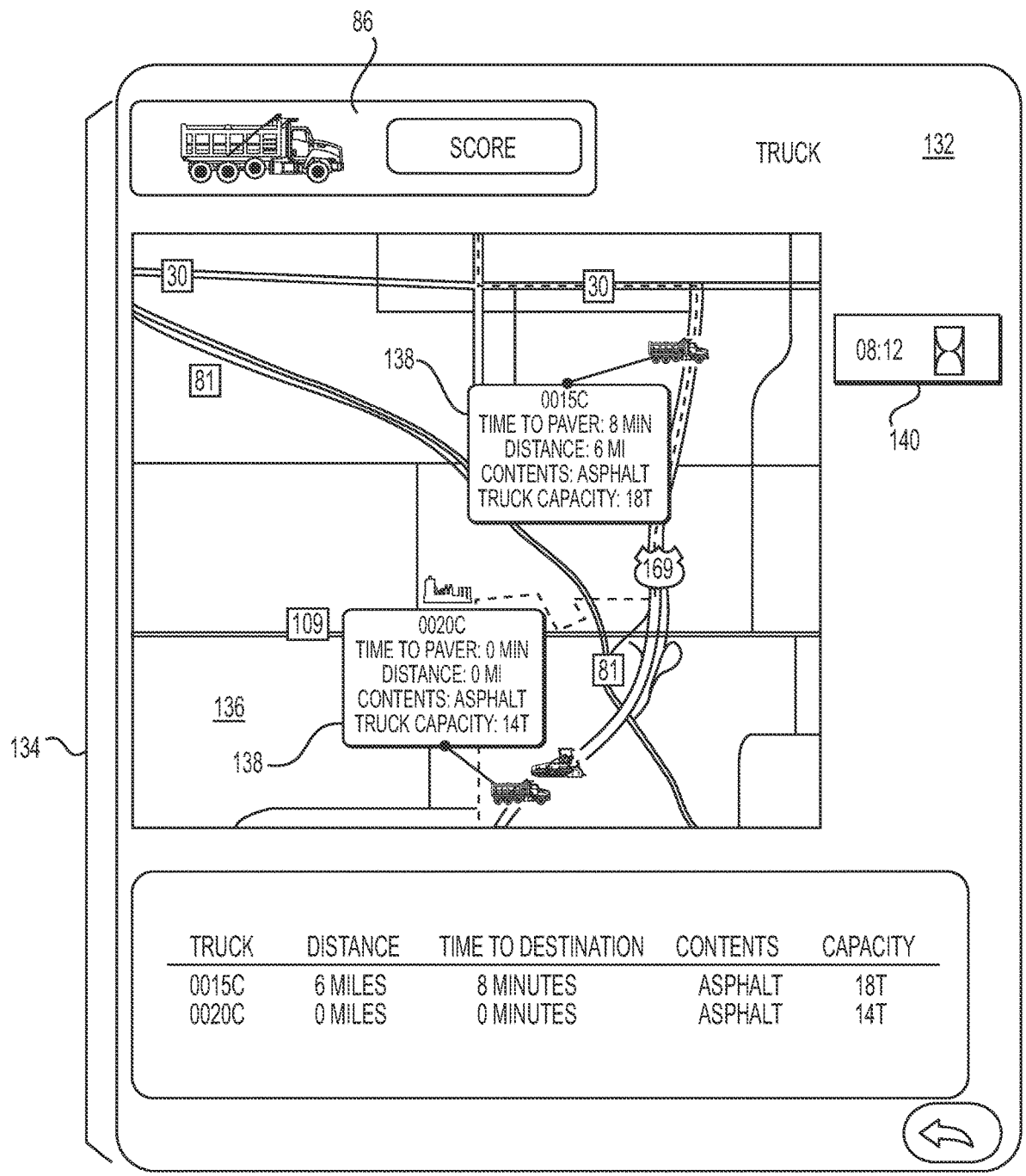

Referring again to FIG. 3, when the supervisor selects a first graphical objet 86 associated with another of machines 12, off-board computer 68 may generate another GUI corresponding to the selected machine 12. For example when the supervisor selects a first graphical object 86 associated with one of haul trucks 16, off-board computer 68 may generate a corresponding GUI. For example, as shown in FIG. 7, off-board computer 68 may generate a graphical user interface (GUI) 132 corresponding to a particular one or group of haul trucks associated with the surfacing operation. GUI 132 may contain graphical objects 134 indicative of a difference between an operating parameter associated with compactor 20 and an associated expected or target value. That is, graphical objects 134 may be indicative of the difference between an operating parameter and its associated target or expected value that was used to determine the status score displayed in GUI 84.

For example, based on other information, such as the production rate of paver 18, the amount of material in hopper 32, and/or the number of trucks traveling between plant 30 and worksite 10 (as discussed above), off-board computer 68 may determine a target arrival time for each haul truck 16 traveling to worksite 10 with fresh paving material. The target arrival time may be an amount of time until a particular haul truck is needed to deliver material to paver 18. Based on a current location of each haul truck 16 (as determined by an associated location device configured to generate a location signal communicable to off-board computer 68), off-board computer 68 may determine an actual estimated arrival time for each haul truck 16 at worksite 10. Off-board computer 68 may also receive other information, such as traffic conditions, weather conditions, road closure information, and/or other factors available through known (e.g., commercial) resources and use this information to more accurately determine the target and actual arrival time for each haul thick.

Off-board computer 68 may generate a map 136 of an area containing one or more of haul trucks 16, paver 18, and/or plant 30, and generate a haul truck detail object 138 for each haul truck 16 on the map. Haul truck detail object 138 may include information, such as a target time to paver 18, a distance to paver 18, contents of haul truck 16, and a capacity (e.g. weight) of material in haul truck 16. In some embodiments, haul truck detail object 138 may also include an actual or estimated temperature of the paving material within haul truck 16. Off-board computer 68 may also generate an actual estimated arrival time object 140 configured to show the actual estimated arrival time of haul truck 16. When a difference between the actual estimated arrival time and the target arrival time exceeds a tolerable difference, off-board computer 68 may update the status score of haul truck 16 to indicate whether and to what extent haul truck 16 will miss the target arrival time. Off-board computer 68 may then update first graphical objects 86 on GUI 84 to reflect any changes. As shown in FIG. 7, the first graphical object 86 associated with the selected machine 12 (e.g., haul truck 16) may be shown in GUI 132 to allow the supervisor to see the updated status score without having to return to GUI 84 (referring to FIG. 3), thereby allowing for a speedy assessment process.

Figure 8:
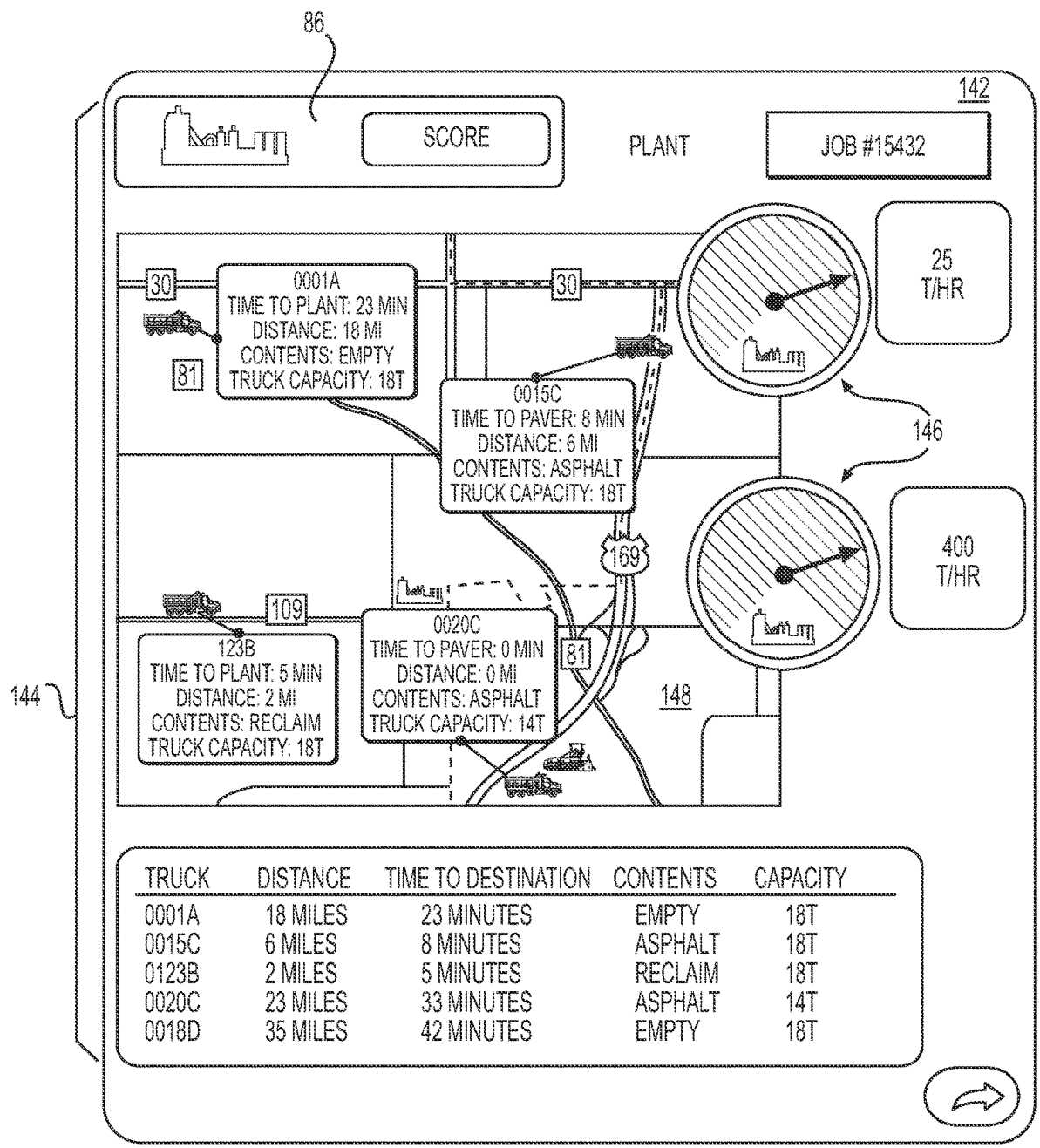

Referring again to FIG. 3, when the supervisor selects a first graphical objet 86 associated with plant 30, off-board computer 68 may generate another GUI corresponding to plant 30. For example, as shown in FIG. 8, off-board computer 68 may generate a graphical user interface (GUI) 142 that contains graphical objects 144 indicative of a difference between an operating parameter associated with plant 30 and an associated expected or target value. That is, graphical objects 144 may be indicative of the difference between an operating parameter and its associated target or expected value that was used to determine the status score displayed in GUI 84.

For example, based on the known production rate of plant 30, a known amount of material needed to complete the surfacing operation (e.g., based on a predetermined design model), an known amount of time available for completing the surfacing operation (e.g., entered by the supervisor), off-board computer 68 may monitor the production rate of plant 30 and determine whether and to what extent the production rate of plant 30 is above, at, or below a production rate needed to sustain operations at worksite 10. When a difference between the production rate of plant 30 and the target production rate falls below a tolerable difference, off-board computer 68 may update the status score of plant 30 to indicate whether and to what extent plant 30 will be unable to meet the demand of the paving operation. Off-board computer 68 may then update first graphical objects 86 on GUI 84 to reflect any changes. As shown in FIG. 8, the first graphical object 86 associated with plant 30 may be shown in GUI 142 to allow the supervisor to see the updated status score without having to return to GUI 84 (referring to FIG. 3), thereby allowing for a speedy assessment process.

GUI 142 may include a plant production rate object 146 configured to show the supervisor the production rate of plant 30 and may be indicative of whether and to what extent plant 30 will be able to satisfy the material demand at worksite 10. Off-board computer 68 may also generate a map 148 on GUI 142 showing an area containing one or more plants 30 within a certain distance of worksite 10. When multiple plants 30 are shown on map 148, off-board computer 68 may generate plant production rate object 146 for each plant 30 to allow the supervisor to visualize whether any other plants in the area can be relied on to make up for unfulfilled demand. As shown in FIG. 8, map 148 may be combined with map 124 (referring to FIG. 7).

In some embodiments, other information relating to plants 30 may also be provided via GUI 142. For example, other graphical objects may be included to display a production temperature associated with each plant, a distance value from each plant to worksite 10, a maximum amount of paving material available, and/or other information. If a situation at plant 30 causes the production rate to drop or the production temperature of plant 30 falls below a minimum temperature needed to successfully transport material from plant 30 to worksite 10 before it cools (e.g., as determined by off-board computer 68 in conjunction with the known locations of plant 30 and worksite 10), off-board computer 68 may regenerate the associated graphical object and/or update the status score of plant 30 and update first graphical object 86 (on GUI 84 and/or GUI 142) to reflect any changes.

It is also noted that any information generated by off-board computer 68 and shown to the supervisor on display device 66c may also or alternatively be similarly communicated and shown to the operator of any one or more of machines 12 (e.g., via display devices 66a, 66b), as desired, to help operators visualize more effectively control operational aspects of the surfacing operation.

Several advantages may be associated with the disclosed control system. For example, because control system 50 may help supervisors to coordinate the operations of each of machines 12 by aggregating information from several data sources into a single control resource, supervisors may be able to quickly and easily address several operational issues from any location where a communication signal can be maintained. Further, because data from a plurality of sources is aggregated into a single control device, supervisors may be able to quickly obtain multiple pieces of relevant information without relying on other personnel or having to search through a plurality of data resources. Additionally, because control system 50 may provide for the generation of GUIs that include qualitative indicia of operational aspects, supervisors may be able to quickly and easily identify and understand situations needing corrective action as they are occurring, thereby allowing for the possibility of a fast and accurate on-the-spot assessment and resolution. Because supervisors may be able to simulate or actually command changes to the operations of machines 12, effective solutions may be able to be reached using iterative adjustments and observations.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A system for monitoring performance of a plurality of machines associated with a paving operation on a worksite, comprising:

a first plurality of sensors mounted to one or both of a paver and compactor gathering first data regarding first operating parameters associated with the one of the paver or compactor at the worksite, wherein the first operating parameters include two or more of a ground-speed, travel direction, a temperature of paving material within a hopper of the paver or laid as a mat, an amount of the paving material deposited or within a hopper of the paver; a width of screed, a thickness of paving material, a mass flow rate or a distance between the compactor and paver;

a production system configured to report second data regarding second operating parameter associated with an asphalt production plant, wherein the second operating parameter include one or more of a temperature of paving material at the asphalt production plant, a production rate of the material production plant or a maximum amount of paving material available from the material production plant;

a transport system configured to report third data regarding third operating parameter of a truck bringing paving material from the asphalt production plant to the worksite, wherein the third operating parameter includes one or more of an arrival time at the worksite, a speed of the truck, a distance of the truck from the worksite or a temperature of paving material within the at haul truck;

a communication device in electronic communication with the st plurality of sensors, the production system and the transport system; and a computer in electronic communication with the communication device and having a display device configured to display the first, second and third operating parameters to a user and an input device configured to receive user inputs.

2. The system of claim 1; wherein the computer comprises an off-board device that operates via a server to coordinate exchange of data messages with the paver, the compactor, the asphalt production plant and the truck, wherein the data messages include one or more of the first operating parameters, second operating parameter and third operating parameter.

3. The system of claim 1, wherein the computer is configured to alert the user if one or more of the first operating parameters, second operating parameter and third operating parameter deviates from an expected, target or threshold value.

4. The system of claim 3, wherein the computer is configured to continuously receive the first operating parameters, second operating parameter and third operating parameter and update the alert to the user based upon the continuously receiving the first operating parameters, second operating parameter and third operating parameter.

5. The system of claim 1, further comprising a controller configured to determine a target groundspeed for the paver based upon the first operating parameters and the second operating parameter and to control the paver to operate with the target groundspeed.

6. The system of claim 1, further comprising a controller configured to determine a desired distance for the compactor to trail the paver based upon the temperature of the paving material laid as the mat and to control the compactor to operate at the desired distance.

7. The system of claim 1, further comprising a controller configured to determine a desired distance for the compactor to trail the paver based upon if the compactor is achieving a target amount of impacts per foot.

8. The system of claim 1, wherein the computer is configured to display one or more of the groundspeed, the number of impacts per foot achieved, a surface temperature of a work surface, or a pass count as a function of the location of the compactor.

9. The system of claim 8, wherein the computer is configured to construct a map to indicate associate values for the one or more of the groundspeed, the number of impacts per foot achieved, the surface temperature of a work surface; or the pass count for each recorded location.

10. The system of claim 9, wherein the map displays the surface temperature of the work surface to allow the user to identify if the compactor is operating in areas that are above, at, or below a target temperature for compaction.

11. The system of claim 1, wherein the computer is configured to, based on one or more of the mass flow rate of paver, the amount of material in the hopper, or a number of trucks traveling between the asphalt production plant and worksite, determine a target arrival time for each truck traveling to worksite.

12. The system of claim 11, wherein the computer determines the target arrival time additionally based upon one or more of traffic conditions, weather conditions, or road closure information.

13. The system of claim 1, wherein the computer continuously monitors the production rate of the material production plant and determines if the production rate is above, at or below a sufficient production rate to sustain operations at the worksite.

14. A system for monitoring performance of a plurality of machines associated with a paving operation on a worksite, comprising:
  a first plurality of sensors mounted to a paver gathering first data regarding first operating parameters associated with the paver at the worksite, wherein the first operating parameters include one or more of a groundspeed, travel direction, a temperature of paving material within a hopper of the paver or laid as a mat, an amount of the paving material deposited or within a hopper of the paver, a width of screed, a thickness of paving material, a mass flow rate or a distance between the paver and a compactor;
  a production system configured to report second data regarding second operating parameter associated with an asphalt production plant, wherein the second operating parameter include one or more of a temperature of paving material at the asphalt production plant, a production rate of the material production plant or a maximum amount of paving material available from the material production plant;
  a communication device in electronic communication with the least first plurality of sensors and the production system; and
  a computer in electronic communication with the communication device and having a display device configured to display the first and second operating parameters to a user and an input device configured to receive user inputs, wherein the off-board computer is configured to determine a target groundspeed for the paver based upon the first operating parameters and the second operating parameter and to display the target groundspeed.

15. The system of claim 14, wherein the computer includes a controller configured to control the paver to operate with the target groundspeed.

16. The system of claim 14, wherein the computer comprises an off-board device that operates via a server to coordinate exchange of data messages with the paver, the asphalt production plant and one or more trucks, wherein the data messages include one or more of the first operating parameters, and second operating parameter.

17. The system of claim 14, wherein the computer is configured to alert the user or operator if the groundspeed of the paver deviates from the target groundspeed.

18. A system for monitoring performance of a plurality of machines associated with a paving operation on a worksite, comprising:
  a first plurality of sensors mounted to a paver gathering first data regarding first operating parameters associated with the paver at the worksite, wherein the first operating parameters include one or more of a groundspeed, travel direction, a temperature of paving material within a hopper of the paver or laid as a mat, an amount of the paving material deposited or within a hopper of the paver, a width of screed, a thickness of paving material, a mass flow rate or a distance between the paver and a compactor;
  a transport system configured to report second data regarding second operating parameter of a truck bringing paving material from the asphalt production plant to the worksite, wherein the second operating parameter includes one or more of an arrival time at the worksite, a speed of the truck, a distance of the truck from the worksite or a temperature of paving material within the at haul truck;
  a communication device in electronic communication with the at least first plurality of sensors and the transport system; and
  a computer in electronic communication with the communication device and having a display device configured to display the first and second operating parameters to a user and an input device configured to receive user inputs, wherein the computer is configured to, based on one or more of the mass flow rate of paver, the amount of material in the hopper, or a number of trucks traveling between the asphalt production plant and worksite, determine a target arrival time for each truck traveling to worksite.

19. The system of claim 18, wherein the computer determines the target arrival time additionally based upon one or more of traffic conditions, weather conditions, or road closure information.

20. The system of claim 18, wherein the computer comprises an off-board device that operates via a server to coordinate exchange of data messages with the paver and the truck, wherein the data messages include one or more of the first operating parameters and second operating parameter.

* * * * *